US008585009B2

(12) United States Patent
Zhu et al.

(10) Patent No.: US 8,585,009 B2
(45) Date of Patent: Nov. 19, 2013

(54) FLOW CONTROL VALVE (75) Inventors: Xiangzhen Zhu, Cheltenham (GB);
Richard Timothy Hopson, Cheltenham (GB)

(73) Assignee: Kohler Mira Limited, Cheltenham, Gloucester (GB)

(*) Notice: Subject to any disclaimer, the term of this patent is extended or adjusted under 35 U.S.C. 154(b) by 716 days.

(21) Appl. No.: 12/746,326

(22) PCT Filed: Dec. 8, 2008

(86) PCT No.: PCT/GB2008/004020
§ 371 (c)(1),
(2), (4) Date: Jun. 4, 2010

(87) PCT Pub. No.: WO2009/071902
PCT Pub. Date: Jun. 11, 2009

(65) Prior Publication Data
US 2010/0282326 A1    Nov. 11, 2010

(30) Foreign Application Priority Data
Dec. 6, 2007    (GB) .................................. 0723827.2

(51) Int. Cl.
*F16K 31/44*    (2006.01)
*F16K 31/12*    (2006.01)
*F16K 31/02*    (2006.01)

(52) U.S. Cl.
USPC .................... 251/69; 251/30.03; 251/129.15; 251/129.03

(58) Field of Classification Search
USPC ........... 251/69, 30.03–30.04, 129.03, 129.11, 251/129.15
See application file for complete search history.

(56) References Cited

U.S. PATENT DOCUMENTS

| | | | | |
|---|---|---|---|---|
| 2,863,628 A * | 12/1958 | Rimsha et al. | ............ | 251/30.03 |
| 2,888,234 A * | 5/1959 | Dahl | ......................... | 251/30.03 |
| 3,872,878 A * | 3/1975 | Kozel et al. | ................... | 137/242 |
| 3,955,792 A * | 5/1976 | Cho | ................................ | 251/69 |
| 4,178,573 A * | 12/1979 | Swanson | ........................ | 335/255 |
| 5,497,672 A * | 3/1996 | Appleford et al. | ............ | 74/89.29 |
| 5,622,351 A * | 4/1997 | Kim | ............................. | 251/30.03 |
| 5,738,138 A * | 4/1998 | Grunert et al. | ................. | 137/245 |
| 5,915,668 A * | 6/1999 | Hodapp et al. | ............ | 251/129.13 |
| 6,076,550 A * | 6/2000 | Hiraishi et al. | ................ | 137/550 |
| 6,572,075 B2 * | 6/2003 | Iwabuchi | ......................... | 251/64 |
| 7,007,923 B2 * | 3/2006 | Dorigo et al. | ............. | 251/129.11 |
| 2004/0069355 A1 | 4/2004 | Sollier | | |
| 2005/0184261 A1 * | 8/2005 | Stern | ......................... | 251/30.03 |

FOREIGN PATENT DOCUMENTS

| | | |
|---|---|---|
| DE | 195 16 054 A1 | 11/1995 |
| DE | 44 23 313 A1 | 1/1996 |
| DE | 202 20 630 U1 | 2/2004 |
| EP | 1 431 640 A1 | 6/2004 |
| FR | 2 875 573 | 3/2006 |

* cited by examiner

Primary Examiner — Eric Keasel
Assistant Examiner — David Colon Morales
(74) Attorney, Agent, or Firm — Greer, Burns & Crain, Ltd.

(57) ABSTRACT

A flow control valve including a linear electric actuator for controlling flow through the valve, and a closure device operable to close the valve independently of the linear electric actuator if the linear actuator is disabled when the valve is open.

11 Claims, 5 Drawing Sheets

FLOW CONTROL VALVE

This invention relates to flow control valves for fluid flow lines such as water supply pipes. The invention has particular, but not exclusive application to proportional flow control valves.

Proportional solenoid valves (PSVs) are known in which flow is controlled by varying the current applied to a solenoid to adjust the position of an armature. However there are several disadvantages with these valves. The first is a limitation on displacement of the armature which can place a limitation on the flow that can be achieved. The second is that the power consumption is high. The third is that of high magnetic hysteresis and hysteresis caused by armature friction.

One solution to these problems is to replace the solenoid by a linear actuator which directly drives the armature giving larger displacement, low power consumption and no hysteresis. A limitation with standard linear actuators is that they remain fixed at the current operating point so can't be shut down if the power should fail.

The present invention has been made from a consideration of the foregoing and seeks to provide a flow control valve in which the problems and disadvantages of the known valves are overcome or at least mitigated.

It is a desired aim of the invention to provide a flow control valve operable by a linear actuator wherein the valve can be closed independently of the linear actuator.

It is another desired aim of the invention to provide a flow control valve operable by a linear actuator wherein the valve can be closed automatically if the linear actuator is disabled when the valve is open.

It is yet another desired aim of the invention to provide a flow control valve operable by an electric linear actuator with a shut-off device to close the valve in response to power failure of the linear actuator when the valve is open.

It is a still further desired aim of the invention to provide a method of operating a flow control valve with a linear actuator and automatically closing the valve if the linear actuator is disabled when the valve is open.

According to one aspect of the present invention, there is provided a flow control valve comprising a linear actuator for controlling flow through the valve, and means operable to close the valve independently of the linear actuator.

The linear actuator may be of any known type and in preferred embodiments comprises a linear electric actuator preferably having a shaft driven by an electric motor.

The closure means may be arranged to allow operation of the valve by the linear actuator and which is operable to close the valve if the linear actuator is disabled when the valve is open, for example if the power supply to the linear actuator is interrupted. In one arrangement, the closure means operable to close the valve preferably comprises a solenoid controlled armature configured to follow movement of the linear actuator when the solenoid is energized and biased to close the valve when the solenoid is de-energized. In preferred embodiments, the magnetic force created when the solenoid is energized overcomes the biasing of the armature and urges the armature to follow movement of the linear actuator for controlling flow through the valve.

The linear actuator and solenoid may be connected to a common power source whereby the solenoid is de-energized to close the valve if the power supply to the linear actuator and solenoid is interrupted. Alternatively, the linear actuator and solenoid may be connected to separate power sources and means is provided to interrupt the power supply to the solenoid if the power supply to the linear actuator is interrupted. In this way, the valve is automatically closed independently of the linear actuator if the linear actuator is disabled due to power failure when the valve is open.

The valve may comprise a valve member movable relative to a valve seat for controlling flow. Preferably, the valve comprises a diaphragm valve in which movement of a diaphragm towards and away from a valve seat controls flow through the valve. In some embodiments, the diaphragm follows movement of the armature to control flow through the valve. For example, a pressure force differential may be created across the diaphragm, and the pressure force differential is reversed when the valve is closed to maintain the valve closed (pressure force is equal to pressure X pressurized area). In other embodiments, the diaphragm is coupled to the armature and moves with the armature to control flow through the valve. For example, a member may connect the diaphragm to the armature.

According to another aspect of the present invention, there is provided a flow control valve operable by a linear actuator wherein the valve can be closed automatically if the linear actuator is disabled when the valve is open.

Preferably, the linear actuator is electrically operable and means is provided to close the valve if the power supply to the linear actuator is interrupted when the valve is open.

According to yet another aspect of the present invention, there is provided a flow control valve operable by an electric linear actuator with a shut-off device to close the valve in response to power failure of the linear actuator when the valve is open.

Preferably, the shut-off device comprises a solenoid controlled armature wherein the magnetic force created when the solenoid is energized overcomes a force biasing the armature to close the valve. In this way, power failure of the linear actuator causes the solenoid to be de-energized releasing the armature to close the valve.

According to still another aspect of the present invention, there is provided an electrically operable flow control valve comprising a linear electric actuator having an electric motor for controlling the position of the actuator, an armature responsive to a magnetic force created when a solenoid is energized to follow movement of the actuator to control flow through the valve, the armature being operable if the solenoid is de-energized when the valve is open to close the valve automatically.

Preferably the solenoid is de-energized if the electric motor is disabled when the valve is open, for example if the power supply to the motor is interrupted.

According to still yet another aspect of the invention there is provided a method of operating a valve comprising providing the valve with a linear actuator, operating the linear actuator to open and close the valve to control flow, and providing the valve with an automatic shut-off device operable to close the valve if the linear actuator is disabled when the valve is open.

The automatic shut-off device may comprise a solenoid controlled armature wherein the armature is biased to close the valve when the solenoid is de-energized and wherein the magnetic force created when the solenoid is energized overcomes the biasing and urges the armature to follow movement of the linear actuator.

The invention will now be described in more detail by way of example only with reference to the accompanying drawings in which:

FIG. 9 shows the flow control valve of FIG. 7 in the closed position with the power on;

FIG. 10 shows the flow control valve of FIG. 7 in an open position;

FIG. 13 shows the flow control valve of FIG. 12 in the closed position with the power on;

Figure 1:
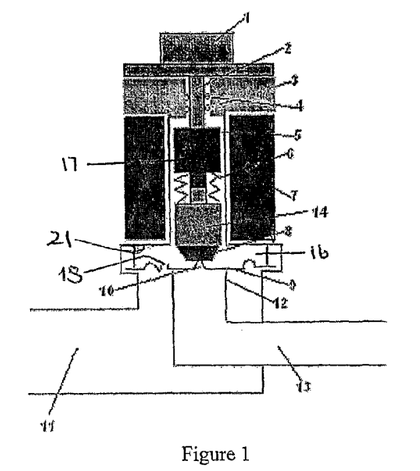
FIG. 1 shows a flow control valve according to a first embodiment of the invention in the normal closed position.
Figure 2:
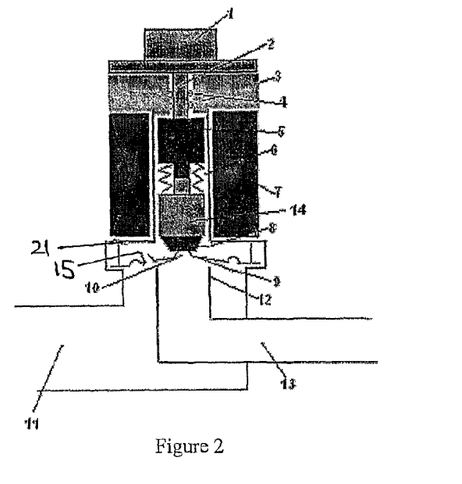
FIG. 2 shows the flow control valve of FIG. 1 in an open position.
Figure 3:
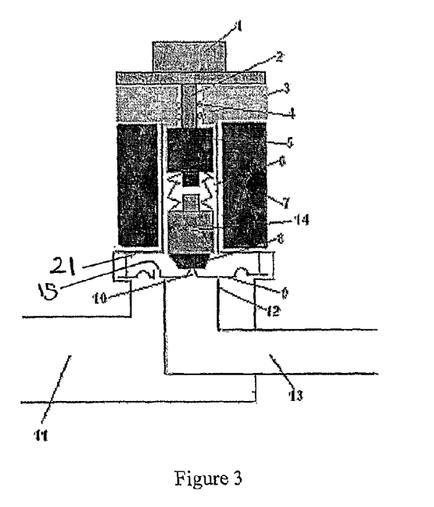
FIG. 3 shows the flow control valve of FIG. 1 in a fail-safe closed position.

Referring first to FIGS. 1 to 3 of the drawings, there is shown a flow control diaphragm valve according to a first embodiment of the invention. The valve includes a linear electric actuator preferably comprising an electric motor 1 and a shaft 2 that extends through an opening in a housing body 3 and is sealed within the opening by a pair of O-ring seals 4. The motor 1 is operable to drive the shaft 2 linearly in the direction of the length of the shaft 2 and is operable to reverse the drive so that the shaft 2 can be reciprocated. Attached to the end of the shaft 2 is a fixed top part 5 of a two part armature 17 located within a solenoid coil 7. The other, floating bottom part 14 of the armature is coupled to the fixed part 5 for movement therewith when the coil 7 is energized and is uncoupled from the fixed part 5 for movement away from the fixed part 5 under the biasing of a spring 6 when the coil 7 is de-energized.

The valve has a diaphragm 9 of rubber or similar material that is movable towards and away from a valve seat 12 to control flow of fluid, for example liquid or gas, from an inlet 11 to an outlet 13. The diaphragm 9 is secured around the marginal edge to define a control chamber 16 and has a central orifice 10 through which fluid can flow from the control chamber 16 to the outlet 13 and a bleed hole 15 through which fluid can flow from the inlet 11 to the control chamber 16. The lower end of the floating part 14 of the armature has a cap 8 of rubber or similar material that co-operates with the central orifice 10 to control flow of fluid from the control chamber 16 to the outlet 13.

In the "normal closed" position of the valve shown in FIG. 1, the diaphragm 9 engages the valve seat 12 preventing flow of fluid from the inlet 11 to the outlet 13, and the cap 8 on the floating part 14 of the armature closes the central orifice 10 in the diaphragm 9 preventing flow of fluid from the control chamber 16 to the outlet 13. At the same time, fluid can flow from the inlet 11 into the control chamber 16 via the bleed hole 15 to balance the pressure in the control chamber 16 with the inlet pressure. As a result, a pressure force differential is created across the diaphragm 9 due to the surface area of the diaphragm 9 exposed to the pressure in the control chamber 16 being larger than the surface area of the diaphragm 9 exposed to the inlet pressure. This pressure force differential urges the diaphragm 9 to maintain engagement with the valve seat 12 and prevent flow of fluid from the inlet 11 to the outlet 13 with power off.

In the "normal closed" position of the valve shown in FIG. 1 with power off, the fixed part 5 of the armature is held firmly against the floating part 14 by the shaft 2 of the linear actuator so that the air-gap therebetween is negligible and the spring 6 is compressed. As a result, only a low power solenoid is required to create a magnetic force to urge the bottom part 14 towards the top part 5 and overcome the biasing of the spring 6 to couple the two parts 5,14 of the armature together.

When opening the valve from the "normal closed" position shown in FIG. 1, the motor 1 is operated to move the shaft 2 and fixed part 5 of the armature away from the "normal closed" position. With power-on, the floating part 14 of the armature is coupled to and follows the fixed part 5 of the armature due to the magnetic force created by the solenoid coil 7 that overcomes the biasing of the spring 6. As a result, the cap 8 on the floating part 14 of the armature moves away from the diaphragm 9 opening the central orifice 10 and allowing fluid to flow from the inlet 11 to the outlet 13 via bleed hole 15, control chamber 16 and the central orifice 10. The hole sizes of the central orifice 10 and bleed hole 15 are appropriately adjusted so that the pressure force in control chamber 16 is sufficiently less than that in inlet 11 so that the pressure force differential across the diaphragm 9 is reversed causing diaphragm 9 to lift away from the valve seat 12 to follow the displacement of floating part 14 of the armature thereby opening the valve and allowing fluid to flow through the valve from the inlet 11 to the outlet 13 as shown in FIG. 2. The displacement of the shaft 2 away from the "normal closed" position controls the diaphragm lift, which in turn controls the flow. The linear actuator is operable with power-on to adjust the position of the diaphragm 9 to any selected position between the "normal closed" position of FIG. 1 and a "fully open" position to vary progressively the flow. The "fully open" position is limited by either bottom surface 21 of the housing body 3 or the maximum displacement of armature 17, depending on which is lower. The maximum displacement of armature 17 is limited by the maximum movement of the shaft 2 of the motor 1. When shutting off the valve, the motor 1 is driven to return the shaft 2 and armature 17 to the "normal closed" position shown in FIG. 1 at which point the power can be turned off.

If power failure occurs in use when the valve is open, the motor 1 can no longer be driven to control the position of the shaft 2 and the fixed part 5 of the armature attached to the shaft 2 stays where it is. The solenoid coil 7 is de-energized with the result that the magnetic force coupling the floating part 14 of the armature to the fixed part 5 can no longer be generated. As a result, the floating part 14 of the armature is instantaneously uncoupled and free to move away from the fixed part 5 of the armature under the biasing of the spring 6 which was compressed when the coil 7 was energized. The floating part 14 closes cap 8 on to the orifice 10 which results in a pressure force differential reversal across the diaphragm 9 so that the diaphragm 9 is pushed down to engage the valve seat 12 in a "fail-safe closed" position shown in FIG. 3 to shut-off fluid flow from the inlet 11 to the outlet 13 and close the valve.

If, following power failure, the power is re-instated, the motor 1 is driven to move the shaft 2 down to the "normal closed" position shown in FIG. 1 whereby the fixed part 5 of the actuator is again coupled to the floating part 14 by the magnetic force created by the solenoid coil 7 and the spring 6 is compressed. The linear actuator can then be operated to open and close the valve and control flow as described above. This operation ensures that the two armature parts, fixed part 5 and floating part 14, are securely coupled when power is restored and enables low powered solenoids to be employed.

The above described valve has a number of benefits that can be summarized as follows:

- Large lift of the diaphragm can be achieved, which gives a very large flow capability compared to conventional proportional solenoid valves.
- The valve will automatically shut off when power fails; this function is not provided with normal motorised valves.
- Very robust performance, easy assembly in production and low cost due to very simple and compact structure.
- No hysteresis caused by magnetic field because flow is controlled by displacement of the linear actuator rather than the strength of magnetic field as in conventional proportion solenoid valves.
- Less power consumption. There are three reasons for this:
    - Virtually zero air gap between the fixed part of the armature and the floating part of the armature which requires very little electrical energy to generate high magnetic force to couple the two parts together. Consequently, only a low power solenoid is required.
    - The linear actuator is not powered all the time. It is only powered when changing flow is required.
    - Because the diaphragm is dynamically pressure balanced, the load acting on the linear actuator shaft is only generated by water pressure acting on the drive shaft which has a small diameter, typically 3 mm. Consequently only a low power linear actuator is required.

Figure 4:
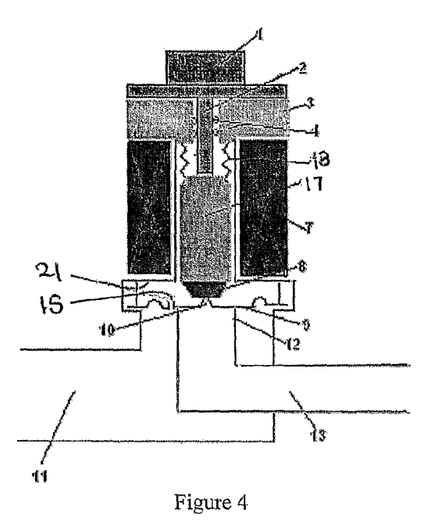
FIG. 4 shows a flow control valve according to a second embodiment of the invention in the normal closed position.
Figure 5:
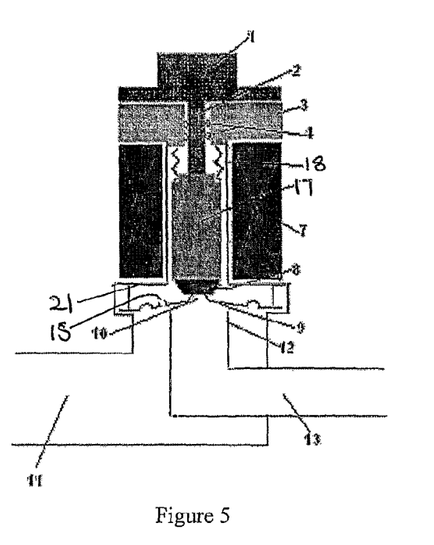
FIG. 5 shows the flow control valve of FIG. 4 in an open position.
Figure 6:
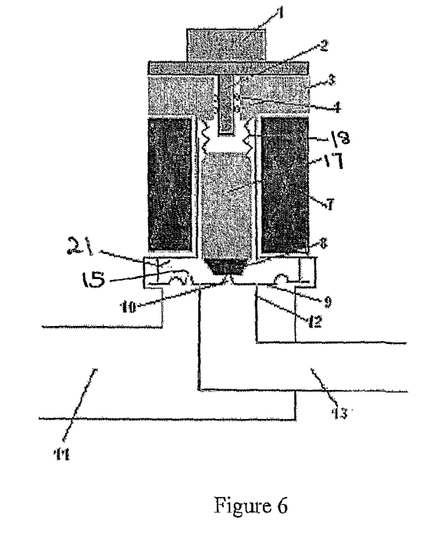
FIG. 6 shows the flow control valve of FIG. 4 in a fail-safe closed position.

Referring now to FIGS. 4 to 6 of the drawings, there is shown a second embodiment of a flow control diaphragm valve according to the invention. For convenience parts of the second embodiment corresponding to the first embodiment are identified by like reference numerals.

In this embodiment, there is no fixed connection between the shaft 2 of the linear actuator and the armature 17. The armature 17 comprises a single part rather than the two-parts of the first embodiment and a spring 18 acts between the housing body 3 and the armature 17 to bias the armature towards the diaphragm 9. The magnetic force created when the solenoid coil 7 is energized overcomes the biasing of the spring 6 so that the armature 17 is urged towards and follows movement of the shaft 2 of the linear actuator to control opening of the valve. In this way, the shaft 2 acts as a stop to control the lift of the armature from zero in the "normal closed" position shown in FIG. 4 to a maximum in the "fully open" position. The "fully open" position is limited by either the bottom surface 21 of the housing body 3 or the maximum displacement of the armature 17, depending on which is lower. The maximum displacement of the armature 17 is limited by either the maximum movement of the shaft 2 of the motor 1 or the position where the magnetic force acting on armature 17 is balanced with the force of the spring 18, depending on which is lower.

When opening the valve from the "normal closed" position shown in FIG. 4, the motor 1 is driven to move shaft 2 away from the diaphragm 9. With power on the solenoid coil 7 is energized and the magnetic force generated by the coil 7 overcomes the biasing of the spring 18 to lift the armature 17 up against the actuator shaft 2 so that the armature 17 follows the movement of the shaft 2. As a result, the cap 8 on the armature 17 moves away from the diaphragm 9 opening the central orifice 10 and allowing fluid to flow from the control chamber 16 to the outlet 13. The pressure force differential across the diaphragm 9 is reversed causing diaphragm 9 to lift away from the valve seat 12 to follow the displacement of the armature 17 thereby opening the valve and allowing fluid to flow through the valve from the inlet 11 to the outlet 13 as shown in FIG. 5. The displacement of the shaft 2 away from the 'normal closed' position controls the diaphragm lift, which in turn controls the flow.

The linear actuator 1 is operable with power-on to adjust the diaphragm 9 to any selected position between the "normal closed" position of FIG. 4 and the "fully open" position to vary the flow. When shutting off the valve, the motor 1 is driven to return the shaft 2 and armature 17 to the "normal closed" position shown in FIG. 4 at which point the power can be turned off. The lift between zero ("closed") and "fully open" is controlled by the lift of the linear actuator shaft 2.

If power failure occurs in use when the valve is open, the motor 1 can no longer be driven to control the position of the shaft 2. The solenoid coil 7 is de-energized with the result that the magnetic force coupling the armature 17 to the shaft 2 can no longer be generated. As a result, the armature 17 is instantaneously uncoupled and free to move away from the shaft 2 under the biasing of the spring 18 which was compressed when the coil 7 was energized with the valve open. The armature 17 closes cap 8 on to the orifice 10 which results in a pressure force differential reversal across the diaphragm 9 so that the diaphragm 9 is pushed down to engage the valve seat 12 in a "fail-safe closed" position shown in FIG. 6 to shut-off fluid flow from the inlet 11 to the outlet 13 and close the valve.

The recover operation following power failure is programmable in a variety of ways. For example, if, following power failure, the power is re-instated, the motor 1 can be left in its current position and only the solenoid coil 7 powered on. This will cause the armature 17 to move to its previous "on" position to allow the valve to open. The linear actuator can then be operated to open and close the valve and control flow as described above. Alternatively, the motor 1 may be driven to move the shaft 2 down to the "normal closed" position as described for the first embodiment.

The above described valve has a number of benefits that can be summarized as follows:

- Large lift of diaphragm can be achieved, which gives a very large flow capability compared to normal proportional solenoid valves.
- The valve will automatically shut off when power fails; this function is not provided with normal motorized valves.
- Very robust performance, easy assembly in production and low cost due to very simple and compact structure.
- No hysteresis caused by the magnetic field or friction because flow is controlled by displacement of linear actuator rather than the strength of magnetic field as in conventional proportional solenoid valves.

Referring now to FIGS. 7 to 11 of the drawings, there is shown a third embodiment of a flow control diaphragm valve according to the invention. For convenience parts of the third embodiment corresponding to the first and second embodiments are identified by like reference numerals.

Figure 7:
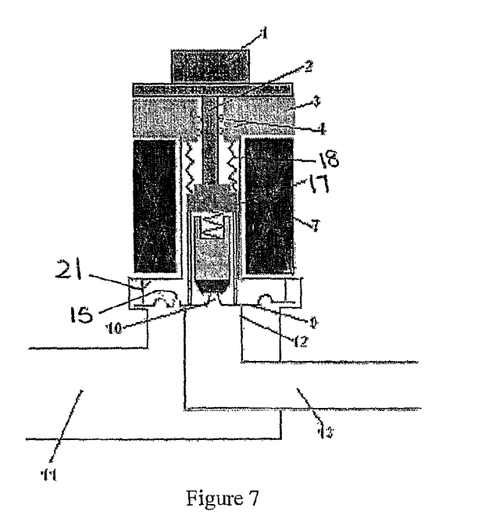
FIG. 7 shows a flow control valve according to a third embodiment of the invention in the normal closed position with the power off.
Figure 8:
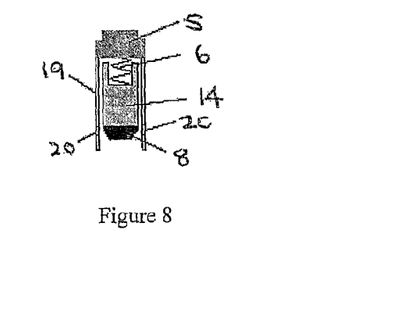
FIG. 8 shows the armature assembly of the flow control valve shown in FIG. 7.

In this embodiment, the armature 17 comprises a top part 5 and a bottom part 14 with a spring 6 therebetween that urges the bottom part 14 towards the diaphragm 9. The bottom part 14 is located within a plastic guide tube 19 that is fixed with top part 5 and extends between the top part 5 and the diaphragm 9. The guide tube 19 is longer than the bottom part 14 and is provided with one or more ports 20 through which fluid can flow. As with the second embodiment, there is no fixed connection between the armature 17 and shaft 2 of the linear actuator and the armature 17 is biased towards the diaphragm 9 by spring 18 acting between the housing body 3 and the top part 5 of the armature 17.

With power off in the "normal closed" position of the valve shown in FIG. 7, the top part 5 of the armature and guide tube 19 are held against the diaphragm 9 by the shaft 2 of the linear actuator. The bottom part 14 of the armature 17 is uncoupled from the top part 5 and is biased by the spring 6 so that that the cap 8 closes the central orifice 10 of the diaphragm 9 creating a pressure differential across the diaphragm 9 as described previously so that the diaphragm 9 maintains engagement with the valve seat 12 to prevent fluid flow through the valve from the inlet 11 to the outlet 13.

Figures 9, 10:
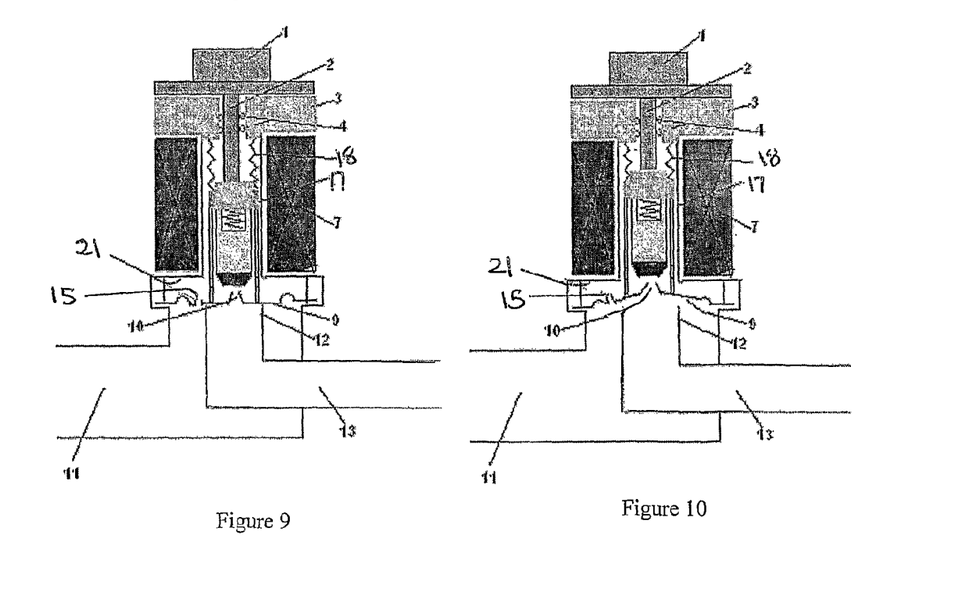

With power on in the "normal closed" position of the valve shown in FIG. 9, the solenoid coil 7 is energized creating a magnetic force that overcomes the biasing of spring 6 and lifts the bottom part 14 of the armature 17 to open the central orifice 10 in the diaphragm 9. This allows a restricted flow of fluid from the control chamber 16 via the ports 20 in the guide tube 19 and central orifice 10 that causes the pressure above the diaphragm to reduce. As a result, the pressure force differential is reversed and thus tries to lift the diaphragm up but the top part 5 of the armature 17 and the guide tube 19 are still held against the diaphragm 9 by the shaft 2 of the linear actuator so that the diaphragm 9 remains in the closed position.

If the motor 1 is then driven to move the shaft 2 away from the diaphragm 9, because the central orifice 10 is always open when the solenoid is energized, a pressure force differential across diaphragm 9 lifts the diaphragm 9 up which pushes the armature 17 against the shaft 2 so as to open the valve as shown in FIG. 10 and allow fluid to flow through the valve from the inlet 11 to the outlet 13. Adjusting the position of the shaft 2 of the linear actuator controls the lift of the armature 17 and thus the lift of the diaphragm 9 to control the flow. In this way, the shaft 2 acts as a stop to control the lift of the armature from zero in the "normal closed" position shown in FIG. 7 to a maximum in the "fully open" position. The "fully open" position is limited by either the bottom surface 21 of the housing body 3 or the maximum displacement of the armature 17, depending on which is lower. The maximum displacement of the armature 17 is limited by the maximum movement of the shaft 2 of the motor 1. The lift of the diaphragm 9 is caused by the pressure force differential due to orifice 10 opening.

The linear actuator is operable with power-on to adjust the diaphragm 9 to any selected position between the "normal closed" position and the "fully open" position to vary the flow. When shutting off the valve, the motor 1 is driven to return the shaft 2 and armature 17 to the "normal closed" position shown in FIG. 9. Then the power is turned off so that the magnetic force of the solenoid coil 7 acting on the bottom part 14 of the actuator is no longer generated and the bottom part 14 is released to move and close the central orifice 10 in the diaphragm under the biasing of spring 6 as shown in FIG. 7. As a result, the valve is completely shut off.

Figure 11:
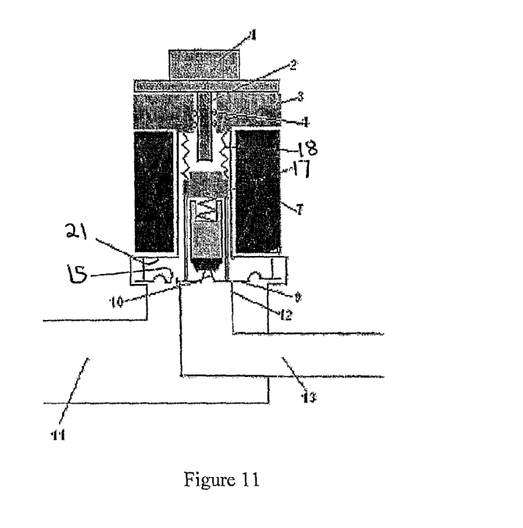
FIG. 11 shows the flow control valve of FIG. 7 in a fail-safe closed position.

If power failure occurs in use when the valve is open, the motor 1 can no longer be driven to control the position of the shaft 2. The solenoid coil 7 is de-energized with the result that the magnetic force coupling the armature 17 to the shaft 2 and coupling the bottom part 14 of the armature to the top part 5 can no longer be generated. As a result, the armature 17 is instantaneously uncoupled and free to move away from the shaft 2 under the biasing of the spring 18. At the same time, the bottom part 14 of the armature is uncoupled and free to move down under the biasing of spring 6 causing cap 8 to close the central orifice 10 in the diaphragm 9 which results in the pressure force differential across the diaphragm 9 being reversed so that the diaphragm 9 is pushed down to engage the valve seat 12 in a "fail-safe closed" position as shown in FIG. 11 to shut-off fluid flow from the inlet 11 to the outlet 13.

The recover operation following power failure is programmable in a variety of ways. For example, if following power failure, the power is re-instated, the motor 1 can be left in its current position, and only the solenoid coil 7 powered on. This will cause the bottom part 14 of armature 17 to move to its previous "on" position to allow the valve to open as shown in FIG. 9. The linear actuator can then be operated to open and close the valve and control flow as described above. Alternatively, the motor 1 may be driven to move the shaft 2 down to the "normal closed" position as described for the first embodiment.

The above described valve has a number of benefits that can be summarized as follows:

Large lift of diaphragm can be achieved, which gives a very large flow capability compared to normal proportional solenoid valves.

The valve will automatically shut off when power fails; this function is not provided with normal motorised valves.

Very robust performance, easy assembly in production and low cost due to very simple and compact structure.

No hysteresis caused by magnetic field because flow is controlled by displacement of linear actuator rather than the strength of magnetic field as in conventional proportion solenoid valves.

The design of armature assembly allows operation with much lower current than conventional on/off solenoids and significantly lower than conventional proportional solenoids.

The diaphragm is stabilized due to the pressure force differential which pushes the diaphragm against the armature, which is stopped by shaft 2, so as to prevent the diaphragm from vibrating and generating hydraulic noise.

Referring now to FIGS. 12 to 16 of the drawings, there is shown a fourth embodiment of a flow control diaphragm valve according to the invention. The fourth embodiment is similar to the third embodiment and, for convenience, parts of the fourth embodiment corresponding to the third embodiment are identified by like reference numerals.

In this embodiment, an assistant or auxiliary armature 22 is provided attached to the end of the shaft 2 and the plastic guide tube 19 is attached to the diaphragm 9 so that they move together.

Figure 12:
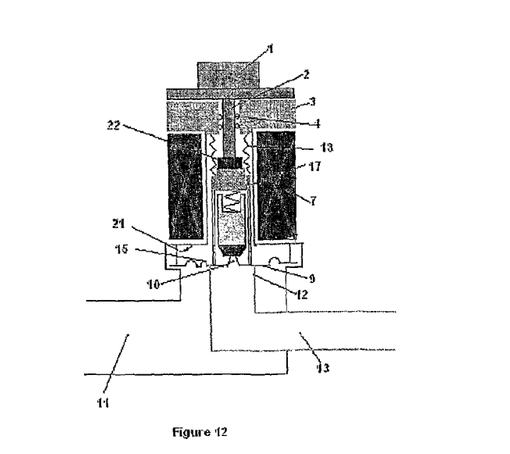
FIG. 12 shows a flow control valve according to a fourth embodiment of the invention in the normal closed position with the power off.

With power off in the "normal closed" position of the valve shown in FIG. 12, the assistant armature 22 is held against armature 17 by the shaft 2 and the diaphragm 9 is held against the valve seat 12 by the guide tube 19. The bottom part 14 of the armature 17 is uncoupled from the top part 5 and is biased by the spring 6 so that that the cap 8 closes the central orifice 10 of the diaphragm 9 creating a pressure differential across the diaphragm 9 as described previously so that the diaphragm 9 maintains engagement with the valve seat 12 to prevent fluid flow through the valve from the inlet 11 to the outlet 13.

Figure 13:
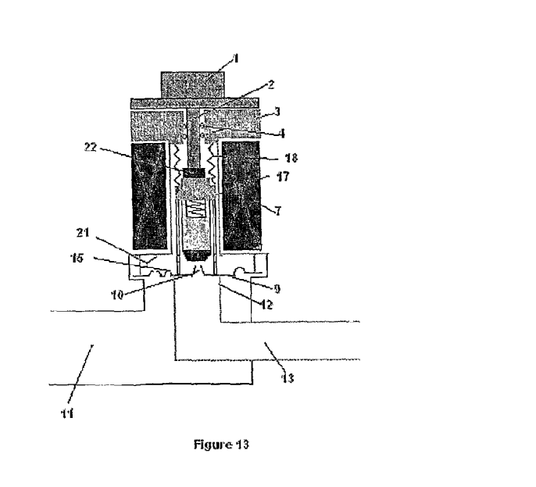

With power on in the " normal closed" position of the valve shown in FIG. 13, the assistant armature 22 is coupled with the top part 5 of armature 17 by the magnetic force generated by the energized coil 7. The magnetic force also overcomes the biasing of spring 6 and lifts the bottom part 14 of the armature 17 to open the central orifice 10 in the diaphragm 9. This allows a restricted flow of fluid from the control chamber 16 via the ports 20 in the guide tube 19 and central orifice 10 that causes the pressure above the diaphragm to reduce. As a result, the pressure force differential is reversed and thus tries to lift the diaphragm up but the top part 5 of the armature 17 and the guide tube 19 are still held against the diaphragm 9 by the shaft 2 and assistant armature 22 of the linear actuator so that the diaphragm 9 remains in the closed position.

Figure 14:
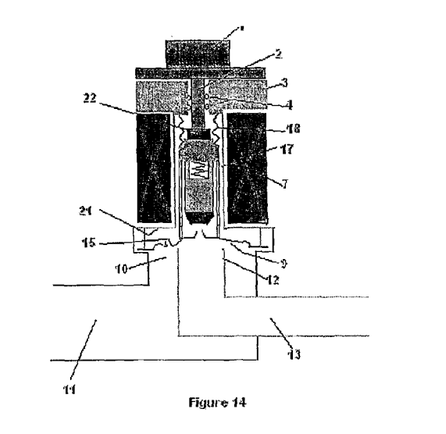
FIG. 14 shows the flow control valve of FIG. 12 in an open position.

If the motor 1 is then driven to move the shaft 2 and assistant armature 22 away from the valve seat 12, because the assistant armature 22 is coupled with the top part 5 of the armature 17 by magnetic force and the guide tube 19 is solidly attached to the top part 5 of the armature 17 and to diaphragm 9, the armature 17, guide tube 19 and diaphragm 9 follow movement of the assistant armature 22 away from the valve seat 12 to open the valve as shown in FIG. 14 and allow fluid to flow through the valve from the inlet 11 to the outlet 13. Flow can be adjusted by controlling the shaft 2 position between the "normal closed" position and the "fully open" position. The limit of the "fully open" position is the same as that in the third embodiment and the operation of shutting off the valve is the same as the third embodiment.

Figure 15:
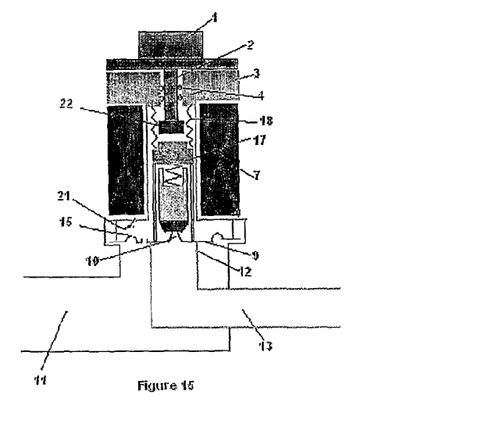
FIG. 15 shows the flow control valve of FIG. 12 in a fail-safe closed position.
Figure 16:
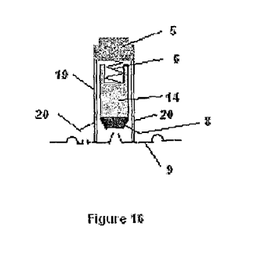
FIG. 16 shows the armature assembly of the flow control valve shown in FIG. 12.

When a power failure occurs in use when the valve is open, the armature 17 is uncoupled from the assistant armature 22 and the bottom part 14 of the armature is uncoupled from the top part 5. As a result, the bottom part 14 moves under the biasing of spring 6 so that cap 8 closes the orifice 10 in the diaphragm 9 and the top part 5 moves together with the guide tube 19 and diaphragm 9 so that the diaphragm 9 engages the valve seat 12 in a "fail-safe closed" position as shown in FIG. 15 to shut-off fluid flow from the inlet 11 to the outlet 13.

The recover operation following power failure is programmable in a variety of ways. For example, the shaft 2 may be driven to the "normal closed" position before starting to control flow as described for the first embodiment so as to make sure that the assistant armature 22 is coupled with the armature 17.

Figure 17:
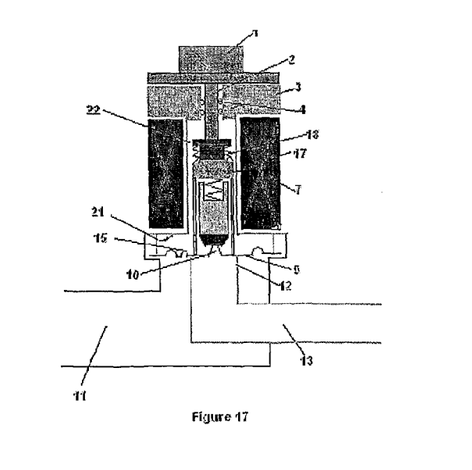
FIG. 17 shows a modification of the flow control valve shown in FIG. 12.

Referring now to FIG. 17, there shown a modification to the fourth embodiment in which like reference numerals are used to indicate corresponding parts. In this modification, the spring 18 is positioned to act between the assistant armature 22 and the top part 5 of the armature 17. With this arrangement, the compression of the spring 18 is constant during normal operation in which the assistant armature 22 and the top part 5 of the armature 17 are coupled at all times of normal operation. In the embodiment of FIGS. 12 to 16, the compression of the spring 18 increases as the armature 17 moves away from the valve seat 12. In other respects, the operation of the valve is the same as the third embodiment and will be understood from the description thereof.

The fourth embodiment has all the benefits of the third embodiment and the following additional benefits:

Because the armatures 17, 22 are coupled when the valve is powered on, and the diaphragm can open without the requirement of a pressure differential, the valve can operate at very low pressure conditions where the pressure differential may be too low to move the diaphragm to open the valve.

When the valve is powered on, the diaphragm 9 and armatures 17, 22 are held together which keeps the diaphragm stable so that noise and vibration caused by instability of the diaphragm may be avoided.

Although the invention has been described with particular reference to diaphragm valves, it will be understood that the invention has application to other types of motorized valves where it is desirable to provide a progressive control of flow with an automatic shut-off if a power failure occurs when the valve is open. For example the invention may be applied to shuttle valves, spool valves and the like.

It will also be understood that the invention may be applied to valves for controlling flow of fluids, including but not limited to liquids and gases, in a range of applications, including but not limited to ablutionary installations for showering, bathing or hand washing. In application to ablutionary installations, the flow control valve may be provided as part of a system for delivering temperature controlled water to an outlet where automatic shut-off may be employed to prevent discharge of water at an elevated temperature.

It will also be understood that features of the embodiments described herein may be employed separately or in combination with features of any of the other embodiments and that the invention includes all such arrangements.

Other applications and uses of the invention will be apparent to those skilled in the art.

The invention claimed is:

1. A flow control valve comprising:
   a valve member engageable with a valve seat in a closed position of the valve;
   a linear electric actuator for controlling movement of said valve member relative to said valve seat between said closed position and a fully open position for controlling flow through the valve; and
   closure means operable to close the valve independently of said linear electric actuator if said linear actuator is disabled when the valve is open;
   said closure means comprising an armature and a solenoid;
   said armature following movement of said linear actuator when said solenoid is energised and being biased in a direction to close the valve when said solenoid is de-energised;
   said valve member comprising a diaphragm having an orifice, a pressure force differential being created across said diaphragm in said closed position of the valve when said orifice is closed so that said diaphragm maintains engagement with said valve seat, and the pressure force differential being reversed when said orifice is open; and
   said armature has a first part and a second part movable relative to said first part,
   said first part being movable according to the position of a shaft of said linear actuator for controlling movement of said diaphragm relative to said valve seat when said solenoid is energized and being biased by a first spring away from said shaft to move said diaphragm to engage said valve seat if the solenoid is de-energised when the valve is open; and
   said second part being biased by a second spring between said first and second parts to close said orifice in said diaphragm when said solenoid is de-energised and being movable to open said orifice when said solenoid is energized.

2. The flow control valve according to claim 1 wherein the linear electric actuator is a motor driving said shaft.

3. The flow control valve according to claim 1 wherein the closure means is operable automatically to close the valve if the linear electric actuator is disabled when the valve is open.

4. The flow control valve according to claim 1 wherein, in use, a magnetic force created when the solenoid is energized overcomes the biasing of the armature.

5. The flow control valve according to claim 4 wherein in use, the solenoid is de-energized if a power supply to the linear electric actuator is interrupted.

6. The flow control valve according to claim 1 wherein said second part of said armature is located within a guide tube that is fixed to said first part and that extends between said first part of said armature and said diaphragm.

7. The flow control valve according to claim 6 wherein said guide tube is longer than said second part of said armature and is provided with one or more ports through which fluid can flow.

8. The flow control valve according to claim 6 wherein said guide tube is attached to said diaphragm.

9. The flow control valve according to claim 6 wherein said diaphragm is held in said closed position when said solenoid is energized until said linear actuator is moved in a direction to open the valve.

10. The flow control valve according to claim 6 wherein said linear actuator is provided with an assistant armature that is coupled to said first part of said armature by the magnetic force created when said solenoid is energized.

11. The flow control valve according to claim 1 wherein said armature is separate from said linear actuator which acts as stop for said armature.

* * * * *